UNITED STATES PATENT OFFICE.

ROBERT SCHMIDLIN, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

YELLOW TO BROWN WOOL-DYESTUFFS AND PROCESS OF MAKING SAME.

1,059,571.  Specification of Letters Patent.  Patented Apr. 22, 1913.

No Drawing.   Application filed July 23, 1912.  Serial No. 711,104.

*To all whom it may concern:*

Be it known that I, ROBERT SCHMIDLIN, chemist, a citizen of the Republic of Switzerland, residing at Höchst-on-the-Main, Germany, have invented certain new and useful Improvements in Yellow to Brown Wool-Dyestuffs and Process of Making Same, of which the following is a specification.

I have found that yellow to brown dyestuffs of the type:

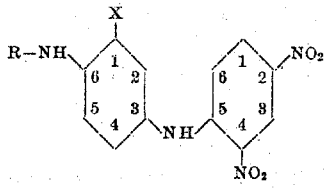

wherein "R" stands for any aryl residue and "X" for a sulfo group, and of great value for dyeing wool, are obtained by condensing p-aminodiphenylaminesulfonic acid or a substitution derivative thereof with 1.2.4-chlorodinitrobenzene. It could not be foreseen that it would be possible to produce in this manner valuable, and particularly, sufficiently soluble dyestuffs; for it was rather to be expected that by the introduction of a dinitrohydrocarbon there would be obtained bodies even less soluble than the parent-product. The dyeings obtained by the dyestuffs of the said type are remarkable for their excellent fastness to light and their great resistance to alkalis.

The following example illustrates my invention, the parts being by weight:

For manufacturing the dyestuff of the formula:

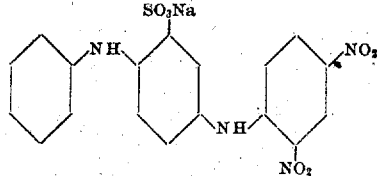

the procedure may, for instance, be as follows: 30 parts of sodium aminodiphenylaminesulfonate are dissolved in about 150 parts of water and the solution is mixed at the temperature of the water-bath, while stirring, with 20 parts of 1.2.4-chlorodinitrobenzene and 10 parts of powdered chalk. The condensation product quickly separates in the form of a brown mass. After filtering and washing the sodium salt of the dyestuff is obtained by heating the mass with a solution of sodium carbonate and precipitating the filtrate with common salt.

In an analogous manner may be obtained a similar dyestuff by using as parent-products the sodium aminotolylphenylaminesulfonate.

The new dyestuffs are dark-colored crystalline powders, readily soluble in hot water, difficultly soluble in cold water and dyeing wool yellow to brown tints fast to light and alkalis.

Having now described my invention what I claim is:

1. The process of manufacturing yellow to brown wool-dyestuffs, which consists in condensing para-aminophenylarylaminesulfonic acids with chlorodinitrobenzene.

2. The process of manufacturing yellow to brown wool-dyestuffs, which consists in condensing para-aminodiphenylaminesulfonic acids with chlorodinitrobenzene.

3. As new products the dyestuffs of the constitution:

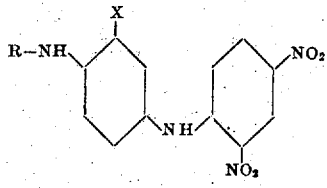

wherein "R" stands for any aryl residue, and "X" for a sulfo group, said dyestuffs being dark-colored crystalline powders, readily soluble in hot water, difficultly soluble in cold water and dyeing wool yellow to brown tints fast to light and alkalis.

4. As a new product, the dyestuff of the constitution:

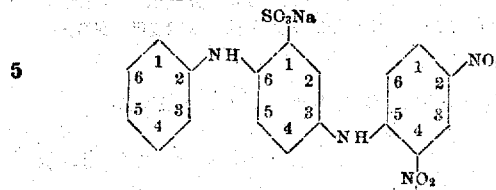

being a dark-colored crystalline powder, readily soluble in hot water, difficultly soluble in cold water, and dyeing wool yellowish-brown tints fast to light and alkalis.

In testimony whereof, I affix my signature in presence of two witnesses.

ROBERT SCHMIDLIN.

Witnesses:
 JEAN GRUND,
 AUGUST STORK.

---

Correction in Letters Patent No. 1,059,571.

It is hereby certified that in Letters Patent No. 1,059,571, granted April 22, 1913, upon the application of Robert Schmidlin, of Höchst-on-the-Main, Germany, for an improvement in "Yellow to Brown Wool-Dyestuffs and Processes of Making Same," an error appears in the printed specification requiring correction as follows: Page 1, line 47, before "aminodiphenyl-" insert *para-;* and that the said Letters Patent should be read with this correction therein that the same may conform to the record of the case in the Patent Office.

Signed and sealed this 4th day of August, A. D., 1914.

[SEAL.]

J. T. NEWTON,
*Acting Commissioner of Patents.*

4. As a new product, the dyestuff of the constitution:

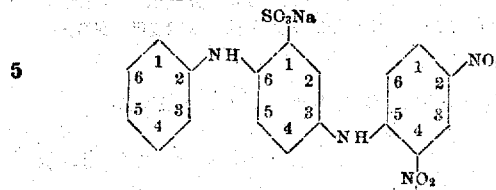

being a dark-colored crystalline powder, readily soluble in hot water, difficultly soluble in cold water, and dyeing wool yellowish-brown tints fast to light and alkalis.

In testimony whereof, I affix my signature in presence of two witnesses.

ROBERT SCHMIDLIN.

Witnesses:
JEAN GRUND,
AUGUST STORK.

---

Correction in Letters Patent No. 1,059,571.

It is hereby certified that in Letters Patent No. 1,059,571, granted April 22, 1913, upon the application of Robert Schmidlin, of Höchst-on-the-Main, Germany, for an improvement in "Yellow to Brown Wool-Dyestuffs and Processes of Making Same," an error appears in the printed specification requiring correction as follows: Page 1, line 47, before "aminodiphenyl-" insert *para-;* and that the said Letters Patent should be read with this correction therein that the same may conform to the record of the case in the Patent Office.

Signed and sealed this 4th day of August, A. D., 1914.

[SEAL.]

J. T. NEWTON,
*Acting Commissioner of Patents.*

It is hereby certified that in Letters Patent No. 1,059,571, granted April 22, 1913, upon the application of Robert Schmidlin, of Höchst-on-the-Main, Germany, for an improvement in "Yellow to Brown Wool-Dyestuffs and Processes of Making Same," an error appears in the printed specification requiring correction as follows: Page 1, line 47, before "aminodiphenyl-" insert *para-;* and that the said Letters Patent should be read with this correction therein that the same may conform to the record of the case in the Patent Office.

Signed and sealed this 4th day of August, A. D., 1914.

[SEAL.]

J. T. NEWTON,
*Acting Commissioner of Patents.*